US00RE35964E

United States Patent [19]

Wellons

[11] E Patent Number: Re. 35,964

[45] **Reissued Date of Patent: *Nov. 17, 1998**

[54] RUMINANT ANIMAL FEED SUPPLEMENT

[75] Inventor: Fred H. Wellons, Greensboro, N.C.

[73] Assignee: CBP Resources, Inc., Greensboro, N.C.

[ * ] Notice: The term of this patent shall not extend beyond the expiration date of Pat. No. 4,919,940.

[21] Appl. No.: 299,695

[22] Filed: Sep. 1, 1994

Related U.S. Patent Documents

Reissue of:

[64] Patent No.: 5,206,041
Issued: Apr. 27, 1993
Appl. No.: 944,037
Filed: Sep. 11, 1992

U.S. Applications:

[63] Continuation of Ser. No. 470,391, Jan. 24, 1990, abandoned, which is a continuation of Ser. No. 272,095, Nov. 16, 1988, Pat. No. 4,919,940.

[51] Int. Cl.[6] ..... A23K 1/00

[52] U.S. Cl. ..... 426/2; 426/630; 426/623; 426/636; 426/601; 426/807

[58] Field of Search ..... 426/2, 623, 630, 426/636, 807, 601

[56] References Cited

U.S. PATENT DOCUMENTS

| | | | |
|---|---|---|---|
| 3,011,892 | 12/1961 | Rosenberg | 99/2 |
| 3,541,204 | 11/1970 | Sibbago et al. | 424/38 |
| 3,655,864 | 4/1972 | Grass et al. | 424/38 |
| 3,925,560 | 12/1975 | Scott et al. | 426/2 |
| 3,992,555 | 11/1976 | Kovacs | 426/72 |
| 4,533,557 | 8/1985 | Marvuama et al. | 426/61 |
| 4,642,317 | 2/1987 | Palmquist | 514/558 |
| 4,842,863 | 6/1989 | Nishi Mura et al. | 424/438 |
| 4,919,940 | 4/1990 | Wellons | 426/2 |
| 4,933,183 | 6/1990 | Sharma et al. | 424/439 |
| 5,206,041 | 4/1993 | Wellons | 426/601 |

FOREIGN PATENT DOCUMENTS

| | | | |
|---|---|---|---|
| 1187732 | 5/1985 | Canada | A23K 1/18 |
| 653864 | 1/1986 | Liechtenstein . | |

OTHER PUBLICATIONS

Maclead et al; "Digestability of Hydrogenerated Tallow, Satturated Fatty Acids and Soybean Oil Supplemented Diets by Sheep"; Animal Science vol. 35, pp. 890–895; 1979.

Dr. Jimenez; "High Producing Dairy Cows. Benefit From Feeding Fat"; Feedstuffs—Aug. 18, 1986; pp. 14–17.

Davis; "Fats in Animal Feeds"; 1990; 17 Page Article.

Challipa et al; "Ruminal Fermentation in vivo as Influenced by Long–Chain Fatty Acids"; 1984; Journal of Dairy Science—vol. 69; pp. 1295–1301.

Morrison; "Feeds and Feeding"; The Morrison Publishing Company 1957; Cover Page, pp. 84–85; pp. 706–707.

Nedoerffer et al; 'The Extent of Release of Encapulated Methionine in the Intestine of Canle"; 1970; pp. 333–341.

Frik Sundstol; "Hydrogenated Marine Fat As Feed Supplement"; 1974; Scientific Reports of the Agricultural University of Norway—vol. 53; pp. 1–51; 1974.

Macleod; "Hydrogenated Tallow in Dairy Cattle Rations"; Canadian Society of Animal.

Production Proceedings of the Annual Meeting of the General Society of the Western Branch—1968—p. 26 Brochure.

"Enerjet 98 "—Aug. 1988.

Storry; "The Effects of Increasing Amounts of Dietary Coconut Oil on Milk–Fat Secretion in the Cow "; J. Dairy Res. (1971) pp. 73–77.

Macleod et al; "Influence of Amount and Degree of Saturation of Dietary Fat on Yield and Quality of Milk"; Journal of Dairy Science—vol. 55—No. 4; pp. 439–445; 1971.

Banks et al; "Effects of Inclusion of Different Forms of Dietary Fatty Acid on teh Yield & Composition of Cow's Milk"; Journal of Dairy Research; (1984).51, pp. 387–395.

Baileys Industrial Oil and Fat Products, vol. 1 Fourth Edition (Daniel Sivern Editor) John Wiley & Sons New York pp. 113–115 and 342–350.

Morrison 1957 Feeds and Feeding. A Handbook for the Student Morrison Publishing Co. pp. 84, 85, 706, 707, 658, 659.

*Primary Examiner*—Carolyn Paden
*Attorney, Agent, or Firm*—Rhodes, Coats & Bennett, L.L.P.

[57] ABSTRACT

A process and feed composition for supplying fatty acids to ruminant animals which comprises feeding saturated fatty acids in the form of triglycerides to the animals. These highly saturated triglycerides may be added in an amount preferably between 2–5% of the total dry matter of the ratio. The highly saturated fatty acids according to the present invention have an iodine value of less than 25.

4 Claims, No Drawings

RUMINANT ANIMAL FEED SUPPLEMENT

Matter enclosed in heavy brackets [ ] appears in the original patent but forms no part of this reissue specification; matter printed in italics indicates the additions made by reissue.

CROSS REFERENCE TO RELATED APPLICATIONS

This application *is a reissue of 07/944,037, now U.S. Pat. No. 5,206,041, which* is a continuation of U.S. Ser. No. 07/470,391, filed Jan. 24, 1990, now abandoned, which is a continuation of U.S. Ser. No. 07/272,095, filed Nov. 16, 1988, and issued as U.S. Pat. No. 4,919,940.

BACKGROUND OF THE PRESENT INVENTION

The invention relates to a ruminant animal feed supplement and more specifically to a supplement and feed process which permits ruminant animals to be fed increased amounts of fatty acids in their diet while protecting the microorganisms within the ruminants' stomachs from attack by the fatty acids.

Ruminants, particularly dairy cattle, have high energy demands during the lactation period, especially during the first one-third of the lactation period. During these periods of higher milk production, conventional cattle feeds, such as corn and alfalfa, lack the energy dairy cattle require. As a result, dairy cattle often do not maximize milk yields during this period and also tend to lose body weight due to energy deficiencies in the diet. Fat is an excellent source of energy, if digestibility problems which result from fat intake can be overcome. It has been suggested that, if the proportion of fat or fatty acids in cattle feed, especially during the lactation period, could be increased, the cattle could produce higher milk yields with increased butter fat content without losing body fat and without diminishing the proportion of milk fat in the milk produced.

Recent articles including Pertelsen, A., Feedstuffs (Jun. 27, 1983); Jimenez. A A., Feedstuffs (Aug. 18, 1986); and Palmquist. D. L., Animal Health and Nutrition (Feb. 19, 1987) all recognize that the addition to fat or fatty acids to conventional dairy rations results in benefits which tend to relieve this energy shortage. However, conventional fats, such as tallow or animal fat, soybean oil, cottonseed oil, etc. tend to have a deleterious effect on rumen microorganism populations if added at rates of more than 2–3%. The reason is that, as the supplement enters the rumen, fatty acids attack the microbes which normally digest fiber, protein, and carbohydrates in the food. Without these microorganisms, decreases in milk production are likely to result.

As a result, the use of increased fats or fatty acids to the diet is not as simple as first appears. It is thought that conventional fats interfere with the digestability of feed components by (a) coating the fibrous portion of the diet with lipids which prevent attack by microbes; (b) modifying the rumen population concerned with cellulose digestion; (c) inhibiting the activity of rumen microorganisms; or (d) reducing the retention of calcium due to excessive excretion of soap in the feces. It is also been proven (Palmquist, D. L. and T. C. Jenkins, Journal of Dairy Science, 63:1 (1980) and Chalupa, W. et al., Journal of Dairy Science, 67:1439 (1984) and Chalupa, W. et al., Journal of Dairy Science, 69:1293 (1986)) that "unsaturated" fats have more harmful effects than "saturated" fats. As used herein, the terms "unsaturated", "saturated", and "highly saturated" should be defined. "Unsaturated" fats are those, such as soybean oil, which have an iodine value of 125 or more. "Saturated" fats, such as tallow, are those having an iodine value in the range of 50. Even at this relatively low iodine value, tallow still contains more than one-half unsaturated fatty acids. In further discussion hereinafter, the term "highly saturated" will be used to denote a product that has been chemically altered by being saturated or hydrogenated to form a fat or fatty acid with an iodine value of 35 or less. The iodine value is a measure of the liquidity of the fatty acid, the higher the value, the more liquid the material.

It has previously been proposed to protect the microorganisms in the rumen from attack by fatty acids in various ways. First, fats have been coated with proteins which were then treated with formaldehyde. These cross-linked proteins were "protected" from microbial digestion and the encapsulated fat escaped through the rumen to the abomasum and lower digestive tract. Recently, formaldehyde has been found to have adverse or undesirable physiological effects which preclude the use of formaldehyde and, therefore, the use of this method of providing protein coated fats in dairy feeds.

Another approach involves the use of saturated (iodine value of 35–45) fatty acids in powdered form. Because of their relatively high melting point, the saturated fatty acids move through the rumen without much effect on rumen microorganisms. (See Canadian Patent No. 1,187,732 to Schaub.) The products presently which include saturated fatty acids, however, have prices which cause them be economically marginal or unacceptable.

In the Palmquist et al. U.S. Pat. No. 4,642,317, issued Feb. 10, 1987, there is disclosed a process whereby calcium salts of fatty acids are used to supplement dairy rations. Fatty acids in the form of calcium salts are inert in the rumen and have no apparent negative effects on fermentation. The high pH of the rumen allows these soaps (calcium salts) to move through the rumen without effecting digestion after which they are subsequently split and digested. The Palmquist et al. technique has attained some popularity, however, its cost causes this technique to be economically marginal.

In another approach, saturated fatty acids are formed by hydrogenation process and the glycerides or triglycerides are removed. It is thought that these fatty acids, because they are in free fatty acid form, may still be toxic to rumen microorganisms, although to a lesser extent than unsaturated fatty acids or conventional fats. The resulting product has achieved only limited success and further improvement is believed necessary before such approach becomes acceptable.

There is, therefore, a need for a feed supplement by which ruminants, particularly dairy cattle, can be fed fatty acids at economically productive rates while protecting the rumen microorganisms from the deleterious effects of the fatty acids.

SUMMARY OF THE PRESENT INVENTION

The present invention, in its broadest aspect, is directed to a process and feed supplement for supplying fatty acids containing at least 10 carbon atoms to ruminant animals while protecting the microorganisms in the rumen from attack by the fatty acids which includes the use of highly saturated fatty acids in the form of triglycerides along with the dry matter of the feed ration. By "highly saturated", it is meant that the iodine value of the fatty acids is less than 35 and preferably about 20. This highly saturated fat in triglyceride form apparently insulates the microbes from the effects of the fatty acids until the feed supplement has passed through the rumen and into the other parts of the cow's digestive system. The fatty acids are then freed to carry out the desirable effect for the cow's body maintenance and milk production.

It has been found that any natural fat can be saturated (hydrogenated) to the extent that the iodine value is less than 35. However, economic studies show that saturated fats such as tallow, lard, and grease are already low in the iodine value and, therefore, are cheaper to saturate. Such fats also have cheaper raw material costs than unsaturated or highly unsaturated fats such as soybean or cottonseed oil.

Hydrogenated fats are presently used for industrial purposes such as textile sizing compounds, mold release agents for plastics and rubber, and as reactants for the manufacture of surfactants. However, it is not believed that highly saturated fats (triglycerides) have been utilized as feed supplements before. In fact, triglycerides have previously been thought to be too indigestible for dairy rations (MacLeod and Buchanan-Smith, Journal of Animal Science, 35:890 and Palmquist, D. L., Feedstuffs, (Apr. 30, 1979).

The addition of highly saturated triglycerides in accordance with the present invention increases the energy density of conventional feeds, particularly dairy feeds. Further, the following advantages are noted:

1. When compared to conventional fats, such as tallow and soybean oil, the feed supplement of the present invention is less likely to effect ruminal microorganisms, thereby leaving such microorganisms unaffected to carry out their intended digestibility effects on other feed components in the ration.

2. When compared to other highly saturated free fatty acids, the feed supplement of the present invention which utilizes the triglycerides has a lesser effect on ruminal microorganisms and is more economical due to a lower cost per pound of fat.

3. When compared to the calcium salts of fatty acids, the present invention is more economical due to a lower cost per pound of fat.

4. When compared to conventional feeds without added fat at all, the present invention provides a higher energy density in the total dairy ration thereby allowing for gains in milk production and total herd health, without adversely effecting the function of the ruminal microorganisms.

5. When compared to calcium salts of fatty acids, the present invention provides a feed supplement that contains no discernible taste difference such as occurs with the calcium salts.

The feed supplement of the present invention is fed to the animals in an amount of at least one percent of the dry solids weight of their feed and preferably in the range of 2–5%. Preferable triglycerides include saturated tallow, lard, and grease because of the economies they afford.

It is therefore an object or the present invention to provide a higher energy food supplement for ruminant animals which does not attack the microbes of the animals' rumen.

It is another object of the present invention to provide a feed supplement of the type described which results in an increased fat content in the animal's milk.

It is another object of the present invention to provide a feed supplement of the type described which results in a greater milk yield.

It is yet another object of the present invention to provide a feed supplement which combines the attributes of providing increased production, higher fat content in the milk, protection of the rumen microbes, and enhanced economies.

DETAILED DESCRIPTION OF A PREFERRED EMBODIMENT

Turning now to a preferred embodiment of the present invention, there is first provided a feed supplement which includes the use of highly saturated fatty acids in the form of triglycerides. Such fatty acids should contain at least ten carbon atoms and preferably 10–24 carbon atoms. The selected fatty acids should either have an iodine value or be saturated to the point that the iodine value thereof is less than 35 and preferably approximately 20. While any natural fat (which is generally a mixture of several fatty acids having 10–24 carbon atoms) can be saturated by the process of hydrogenation to the extent that the iodine value is less than 35, in the case of unsaturated fats the procedure may be expensive. However, certain saturated or highly saturated fats such as tallow, lard, and grease, are already low in iodine value, easier to saturate or hydrogenate, are more readily available, have lower costs than higher iodine value vegetable oils, and are therefore more economical in achieving the desired iodine value. The fats may consist of a mixture of fatty acids.

The above described feed supplement is utilized in a process for providing fatty acids to ruminant animals in which the feed supplement is utilized in the form of triglycerides along with the dry matter of the feed ration. The feed supplement should make up at least one percent of the dry solid weights of the ration and preferably between 2–5% thereof. As the normal vegetable material in the animal's diet contains approximately 2% fat, the total fat content of the diet provided by the feed supplement will increase to 5–7%.

There results a cattle feed comprising at least one vegetable material that is edible by ruminant animals and the aforementioned highly saturated triglycerides of fatty acids. The preferred vegetable material include the group containing legume hay, grass hay, corn silage, grass silage, legume silage, corn grain, oats, barley, distillers grain, brewers grain, soya bean meal, and cotton seed meal.

The invention will be further described by the following example:

Saturated triglycerides made from hydrogenated yellow grease were fed to eight lactating Holstein cows in a replicated 4×4 Latin Square to determine the effect of the triglycerides on milk production, feed intake, and digestion. The yellow grease was hydrogenated to such a point that the iodine value was approximately 5. Dietary treatments consisted of a mixed ration (50% corn silage and 50% dry matter concentrate). Diet C consisted of no fat supplement (control); diet YG consisted of 5% yellow grease supplement; diet 3% HYG consisted of a supplement of 3% saturated triglycerides; and diet 5% HYG consisted of a supplement of 5% saturated triglycerides. Diets were fed ad libitum for 21 day periods with milk and fecal grab samples collected the last four days of each period. Thus the test arrangement is as follows:

| | Cow # | | | | | | | |
|---|---|---|---|---|---|---|---|---|
| Period | 1 | 2 | 3 | 4 | 5 | 6 | 7 | 8 |
| 1 | C | YG | 3% HYG | 5% HYG | C | YG | 3% HYG | 5% HYG |
| 2 | YG | 3% HYG | 5% HYG | C | YG | 3% HYG | 5% HYG | C |
| 3 | 3% HYG | 5% HYG | C | YG | 3% HYG | 5% HYG | C | G |
| 4 | 5% HYG | C | YG | 3% HYG | 5% HYG | C | Y | 3% HYG |

The results of the digestibility tests are set forth below with the figures representing the mean percentage of digestion of the eight cows:

| | APPARENT DIGESTIBILITIES (%) Supplements | | | |
|---|---|---|---|---|
| Item | None | YG | 3% HYG | 5% HYG |
| Dry Matter | 70.0 | 72.0 | 69.6 | 68.7 |
| Nitrogen | 65.1 | 59.8 | 59.5 | 57.5 |
| Energy | 65.5 | 60.5 | 58.9 | 56.6 |
| Fatty acids | 73.2 | 67.8 | 53.6 | 47.4 |
| ADF | 31.6 | 21.6 | 18.9 | 20.0 |

Compared to the control and yellow grease, the dry matter digestibility was not significantly different. It is felt that an increase in iodine value to approximately 20 would show improved results in all areas.

The results of the milk yield and composition are set forth below, again the figures representing the mean results from the eight cows:

| | MILK YIELD AND COMPOSITION Supplements | | | |
|---|---|---|---|---|
| Item | None | YG | 3% HYG | 5% HYG |
| Milk, kg/d | 32.0 | 31.5 | 31.9 | 33.6 |
| FCM, kg/d | 29.6 | 25.9 | 28.8 | 32.3 |
| Fat, % | 3.50 | 2.83 | 3.34 | 3.74 |
| Protein, % | 3.20 | 3.07 | 3.17 | 3.09 |
| Solids, % | 12.43 | 11.64 | 12.22 | 12.59 |
| Fat, kg/d | 1.12 | .88 | 1.07 | 1.26 |
| Protein, kg/d | 1.03 | .96 | 1.01 | 1.04 |
| Solids, kg/d | 3.98 | 3.65 | 3.89 | 4.23 |

The results here for the 5% HYG are significant. A dairy farmer's income is predicated on the milk yield combined with the butter fat content (referred to as FCM (fat corrected milk) in the chart). The results indicate a gain of 6¢ per cow per day while on this feed program.

The results of the feed and energy intake are set forth below and is an indication of the cows' acceptance of the various diets:

| | FEED AND ENERGY INTAKE Supplements | | | |
|---|---|---|---|---|
| Item | None | YG | 3% HYG | 5% HYG |
| DM, kg/d | 22.9 | 20.5 | 22.5 | 23.5 |
| N, kg/d | .61 | .56 | .62 | 63 |
| FA, kg/d | .61 | 1.42 | 1.34 | 1.77 |
| ADF, kg/d | 4.34 | 3.99 | 4.03 | 4.48 |
| GE, Mcal/d | 102.6 | 97.6 | 105.1 | 113.2 |
| DE, Mcal/d | 67.3 | 59.0 | 61.9 | 64.2 |

The resulting feed efficiency (Kg of FCM/kg of dry matter intake per day) shows that the 5% HYG diet feed efficiency is 1.37 compared to the control group's efficiency of 1.29. This is significant.

The results of the ruminal fermentation set forth below is an indication of the effect on ruminal microbes. One measure is the amount of volatile, fatty acids (VFA) produced which attack the rumen microbes, and the ratio of acetic to propionic (A/P) acids. As a result of a diet change it is undesirable for the A/P ratio to drop. It is also undesirable for the protozoa population to diminish.

| | RUMINAL FERMENTATION Supplements | | | |
|---|---|---|---|---|
| Item | None | YG | 3% HYG | 5% HYG |
| VFA, mM | 68.1 | 67.9 | 60.5 | 58.1 |
| % of total VFA | | | | |
| Acetic | 59.9 | 57.7 | 60.9 | 62.6 |
| Propionic | 23.3 | 26.2 | 23.0 | 20.9 |
| Isobutyric | .8 | 1.1 | .8 | 1.0 |
| Butyric | 13.2 | 10.5 | 12.0 | 12.4 |
| Isovaleric | 1.3 | 2.0 | 1.6 | 1.7 |
| Valeric | 1.5 | 2.0 | 1.6 | 1.7 |
| A/P | 2.63 | 2.22 | 2.74 | 3.04 |
| pH | 6.75 | 6.77 | 6.88 | 6.97 |
| Protozos | 44.8 | 15.3 | 208.2 | 74.3 |

As evidenced here, the A/P ratio increases for both the 3% HYG and the 5% HYG supplements. Also both supplements result in an increase in the protozoa population.

Overall the tests show that both saturated triglyceraides result in increased milk yield, milk fat content, and fat corrected milk yield compared to a commercial yellow grease supplement while causing fewer negative effects on feed intake and ruminal fermentation. In addition, the 5% HYG even compares more favorably to the control from the standpoint of all tests except digestibility. It is believed that a supplement with an iodine value of 20 would significantly improve digestibility.

It should be apparent that various changes and modifications might be made in the type of fatty acids introduced, the percentage thereof, the iodine value thereof, and the dry matter of the diet without departing from so the scope of the invention which is set forth in the accompanying claims.

What is claimed is:

1. A process for supplying fatty acids containing at least 10 carbon atoms to ruminant animals while protecting the microorganisms in the animal's rumen from attack by the fatty acids comprising feeding highly saturated fatty acids to said animals in the form of triglycerides along with the dry matter content of said animal feed, said dry matter content including at least one vegetable material edible by ruminant animals selected from the group including legume hay, grass hay, corn silage, grass silage, legume silage, corn grain, oats, barley, distillers grain, brewers grain, soya bean meal, and cotton seed meal, said triglycerides being present in an amount effective to protect the microorganisms in the animals' rumen from attack by the fatty acids, wherein the iodine value of said triglycerides is in the range of 5 to 25.

2. The process according to claim 1 wherein said saturated fatty acids comprise at least one percent of the dry matter content of said animals' feed.

3. The process according to claim 1 wherein the saturated fatty acids are provided in an amount equal to 2–5% of the dry matter content of said animals' feed.

4. The process according to claim 1, wherein said saturated fatty acids are selected from the group consisting of [natural fats and oils, including] tallow, lard, and grease.

[5. A cattle feed consisting essentially of at least one vegetable material edible by ruminant animals selected from the group including legume hay, grass hay, corn silage, grass silage, legume silage, corn grain, oats, barley, distillers grain, brewers grain, soya bean meal, and cotton seed meal, and highly saturated triglycerides of fatty acids, said triglycerides being present in an amount effective to protect the microorganisms in the animals' rumen from attack by the fatty acids, wherein the iodine value of said saturated triglycerides is in the range of 5 to 25, which feed significantly improves digestibility.]

[6. The cattle feed according to claim 5 wherein said saturated triglycerides comprise at least one percent of the dry matter content of said animals' feed.]

[7. The cattle feed according to claim 5 wherein the saturated triglycerides are provided in an amount equal to 2–5% of the dry matter content of said animal's feed.]

[8. The cattle feed according to claim 5 wherein said saturated triglycerides are selected from the group consisting of natural fats and oils, including tallow, lard, and grease.]

* * * * *